Jan. 27, 1970    R. C. WEBBER    3,491,544
METHOD AND APPARATUS FOR GUARDING REFRIGERATION SYSTEMS
Filed April 25, 1968

INVENTOR
ROBERT C. WEBBER
BY
Hood, Gust, Irish & Lundy
ATTORNEYS

United States Patent Office

3,491,544
Patented Jan. 27, 1970

3,491,544
METHOD AND APPARATUS FOR GUARDING REFRIGERATION SYSTEMS
Robert C. Webber, P.O. Box 217,
Indianapolis, Ind. 46206
Filed Apr. 25, 1968, Ser. No. 724,055
Int. Cl. F25b 49/00
U.S. Cl. 62—77  4 Claims

ABSTRACT OF THE DISCLOSURE

A method and apparatus for guarding a closed-circuit, phase-change refrigerating system against loss of effectiveness resulting from dissipation of its refrigerant charge. In such a system, there is always a vessel, such as a condenser or receiver, located upstream from the evaporator, and in which, during operation of the system, liquid refrigerant accumulates to a predetermined level, the vessel being filled with gaseous refrigerant above that level. Depletion of the total charge of refrigerant in the system, therefore, will result in lowering the level of liquid refrigerant in that vessel. The present method consists essentially in the steps of monitoring the external temperature of such a heat-permeable vessel at a point below such predetermined liquid level but safely above the outlet from such vessel, and utilizing a rise in that temperature (which will inevitably occur if the liquid level subsides past that point) to energize an alarm. The apparatus of the present invention consists essentially of a temperature-responsive sensor means arranged in heat-exchanging relation with such a point, and means dominated by such a sensor means to energize an alarm upon such a temperature rise.

---

There are many processes and test procedures in industry which require the close maintenance, over relatively long periods of time, of subatmospheric temperatures. Closed-circuit, phase-change refrigerating systems capable, under normal operating conditions, of so maintaining such temperatures to very close tolerances, are known, and they perform their intended functions quite satisfactorily so long as they continue to operate under normal conditions. However, such systems must necessarily operate under relatively heavy super-atmospheric pressures, and leaks do develop in the closed refrigerant circuit.

For effective performance, liquid refrigerant, substantially free from gas bubbles, must be fed to the evaporator during system operation. In every such system, there is included, at a point upstream from the evaporator, a vessel which contains at all times a pool of liquid refrigerant and, above the liquid, gaseous refrigerant under pressure. An outlet from that vessel is located near the bottom of the vessel and liquid refrigerant from that outlet flows to the evaporator. So long as the level of the liquid pool is maintained at a significant height above the vessel outlet, pure liquid, uncontaminated by gas, will flow from the vessel outlet. If, however, the level of the liquid pool is allowed to subside to proximity to the vessel outlet, some gas can escape in the stream flowing toward the evaporator, with a resultant loss of effectiveness of the system to maintain the desired low temperature at the process or test environment.

Depletion of the total charge of refrigerant in the system will result in lowering the level of the liquid pool in such a vessel. If such depletion is caused by leakage in the closed refrigerant circuit, and if that leakage is not discovered and overcome in time, failure of the process or test being conducted will occur.

Thus, it is the primary object of the present invention to provide a method and an apparatus for guarding such refrigerating systems against loss of effectiveness resulting from depletion or dissipation of the refrigerant charge. More specifically, it is an object of the invention to provide means in such a system for monitoring the liquid level in such a vessel and for calling attention to a drop in that level a significant period of time before the liquid level reaches a danger point.

A further object of the invention is to introduce into such a refrigerating system a protective procedure based upon recognition of the fact that the temperature of the liquid in such a vessel is significantly lower than the temperature of the gas above the liquid, and utilizing that fact to energize an alarm when the external temperature at a predetermined point on such a vessel rises significantly above a normal value.

Another object of the invention is to provide simple mechanism for carrying out such a procedure in such a system.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, and in the specific steps stated, so long as the scope of the appended claims is not violated.

Figures 1, 2, 3:
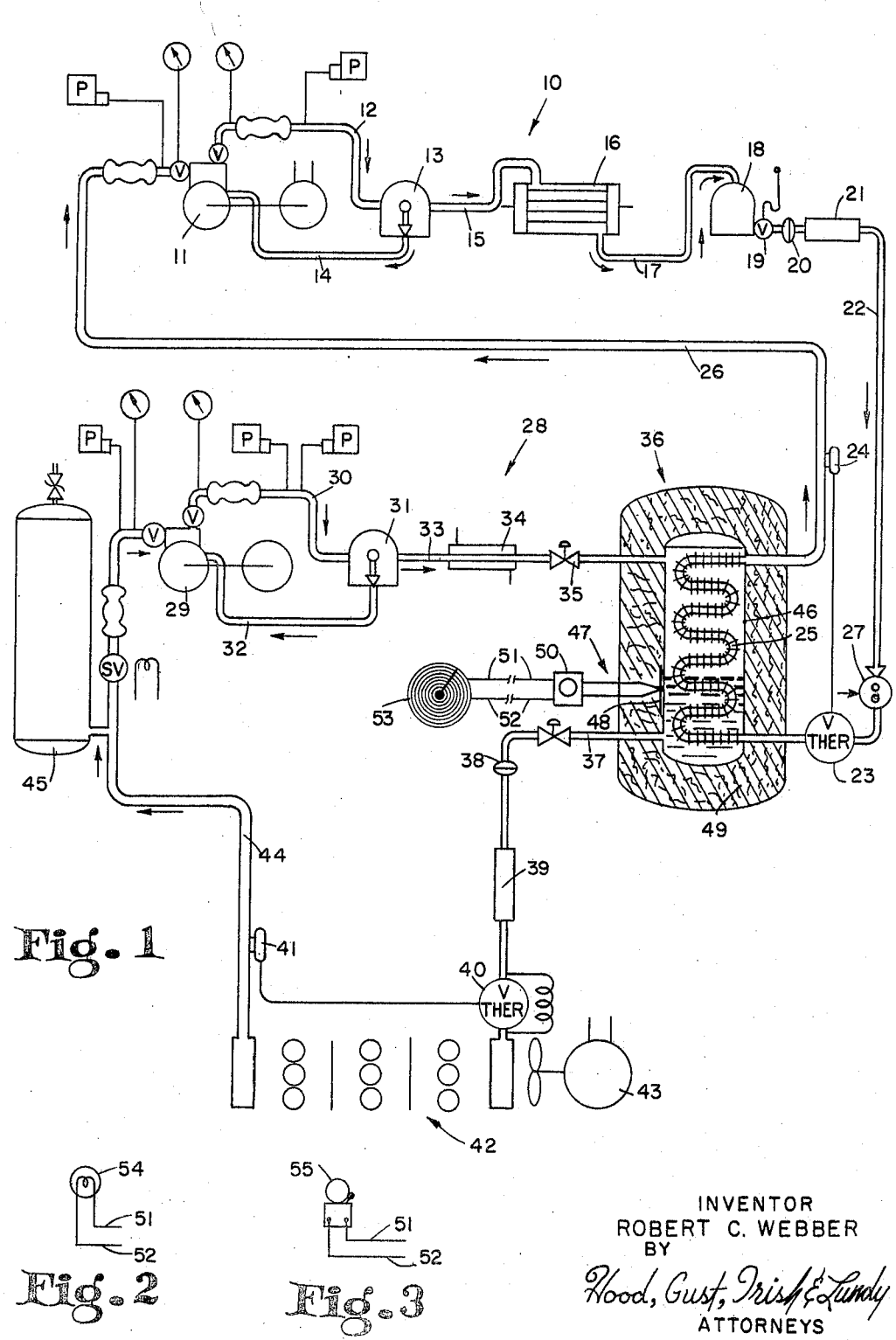
FIG. 1 is a somewhat diagrammatic illustration of apparatus constructed in accordance with the present invention, the temperature sensor means being illustrated as a thermocouple in heat-exchanging relation with a selected point on the condenser of the second stage of a well known cascade refrigerating system.
FIG. 2 is a diagrammatic illustration of a visual type alarm device which may be used in place of, or in addition to, the recording type alarm illustrated in FIG. 1.
FIG. 3 is a diagrammatic illustration of an audible type alarm which may be similarly used in the system.

Referring more particularly to the drawings, it will be seen that I have illustrated a cascade type refrigerating system comprising a primary closed-circuit, phase-change system indicated generally by the reference numeral 10. Since such systems are well known, it need not be described in complete detail. Suffice it to say that the system 10 comprises a compressor 11, conduit means 12 leading from the compressor delivery port to an oil separator 13 from which conduit means 14 returns separated oil to the compressor 11. Conduit means 15 carries hot, compressed, gaseous refrigerant to a condenser 16 which may be either air cooled or water cooled and from which liquid refrigerant flows, through conduit means 17 to and through a receiver 18, whence the liquid refrigerant may flow through a receiver valve 19 equipped, preferably, with a fusible plug, a filter 20 and a dryer 21. Conduit means 22 leads from the dryer, through an expansion valve 23 dominated by sensor means 24, to an evaporator 25; and conduit means 26, with which the sensor means 24 is in heat-exchanging relation, back to the intake side of the compressor 11. Conventionally, a sight glass 27 is connected in the conduit means 22 between the dryer 21 and the valve 23. The system 10 operates at such a temperature that any gas bubbles in the refrigerant stream flowing toward the valve 23 will be visible through the sight glass 27.

The secondary stage 28 of the cascade system illustrated, however, operates at temperatures so low that a similarly-located sight glass will very promptly become so frost-covered as to render it useless.

The system 2 comprises a compressor 29 delivering compressed gaseous refrigerant through conduit means 30 to an oil separator 31 from which oil is conducted, through conduit means 32, back to the compressor 29. Oil-free, hot gas flows through conduit means 33, preferably through a heat-exchanger 34 and an inlet receiver valve 35, to the condenser 36 where it is liquefied and whence it is conducted, by conduit means 37, preferably through a filter 38 and a dryer 39 to a thermostatic expansion valve 40, dominated by heat-responsive means 41, to an evaporator means 42. It will be understood that the evaporator means 42, which may be provided with a fan 43, will be constructed and arranged to maintain a predetermined temperature at a critical point in an industrial process, test, or the like. Evaporated refrigerant leaves the evaporator 42 through conduit means 44, with which the sensor means 41 is in heat-exchanging relationship, and back to the compressor 29. In the illustrated system, I have shown an expansion tank 45, in accordance with the disclosure of my prior Patent No. 2,851,864 issued Sept. 16, 1958; but it will be understood that the presence or absence of such a tank has no critical bearing upon the present invention.

The condenser 36 comprises a tank or vessel 46 of heat-permeable material, provided near its top with an inlet port with which communicates the conduit means 33 and provided near its bottom with an outlet port with which communicates the conduit means 37, the evaporator 25 of the primary system 10 being disposed within the vessel 46 for absorption of heat from the contents of said vessel. In the normal operation of the system, a pool of liquid refrigerant stands in the vessel 46 substantially to the illustrated level, the space above that level being occupied by gaseous refrigerant under pressure. A thermocouple indicated generally by the reference numeral 47 has its temperature sensor means 48 suitably secured in heat-exchanging engagement with the heat-permeable wall of the vessel 46 at a point significantly above the outlet port of said vessel but slightly below the normal level of the liquid pool within the vessel. In accordance with conventional practice, the vessel 46 is externally provided with a heat-insulating jacket 49; and it will be understood, of course, that the element 48 is within said jacket, the leads of the thermocouple 47 penetrating said jacket and being connected, outside the jacket, to suitable amplifying means 50.

As shown in FIG. 1, wires 51 and 52 connect the amplifying means 50 to energize or activate a recording type controller 53. During normal operation of the system, the element 48 will always be subject to the temperature of the liquid refrigerant pool in the bottom of the vessel 46 and the device 53 will trace a substantially uniform graph. If, however, the level of the liquid pool should drop below the point at which the element 48 has a heat-exchanging relation with the wall of the vessel 46, then the element 48 will be subject to the temperature of the gas within the vessel 46, a sharp rise will occur in the graph and the controller 53 will be triggered to activate a suitable mechanism to ensure either automatic or manually-manipulated replenishment of the refrigerant charge.

Of course, depending upon the requirements of the process or test whose temperature must be controlled, the condition within the refrigerating system which has caused dissipation or depletion of the refrigerant charge will be rectified as soon as possible.

As suggested in FIG. 2, a visual alarm device 54 may be used in place of, or in addition to, the unit 53; and, as suggested in FIG. 3, an audible alarm 55 may be similarly used, either such alarm being arranged to be energized from the temperature sensor means upon an increase in temperature at the monitored point on the vessel 46.

It will be apparent that the vessel so monitored need not be a condenser but can be, for instance, a receiver or any other vessel so designed and arranged in the refrigerant circuit upstream from the evaporator as to contain, at all times during normal operation of the system, a pool of liquid refrigerant delivering toward the evaporator, and a body of gaseous refrigerant above the liquid pool.

It will also be apparent that temperature sensor means other than the illustrated thermocouple may be used for sensing a rise in temperature at the monitored point on the vessel. For instance, depending upon the character of the vessel and its environment and upon the desired sensitivity of the warning or indicating means, the illustrated thermocouple may be replaced by a gas filled bulb, a bimetallic thermostat, a thermo dispenser disc, or the like.

Still other changes in the specific apparatus illustrated and described herein may occur to those skilled in the art without departing from the inventive concept defined in the following claims.

I claim as my invention:

1. In a refrigerating system including a compressor, a condenser, an evaporator and conduit means for conducting refrigerant from said compressor through said condenser and said evaporator and back to said compressor, temperature sensor means arranged in heat-exchanging association with an external wall of said condenser at a level between the outlet from said condenser and the level of liquid refrigerant normally retained in said condenser, and means dominated by said sensor for indicating a temperature rise at said first-mentioned level.

2. In a closed-circuit, phase-change refrigerating system including a compressor, an evaporator, and a closed vessel disposed in such circuit between the compressor and the evaporator to contain liquid refrigerant to a predetermined level and a body of gaseous refrigerant under pressure above said predetermined level, said vessel having an outlet below said predetermined level, temperature sensor means arranged in heat-exchanging association with an external wall of said vessel at a point between said outlet and said predetermined level to sense temperature changes at said point, and means dominated by said sensor means for indicating such temperature changes.

3. The invention of claim 2 in which said vessel is a condenser formed of heat-conductive material and provided with a heat insulated jacket, said sensor means being disposed within said jacket and in heat-exchanging contact with the heat-conductive material of said vessel.

4. The method of guarding a closed-circuit, phase-change refrigerating system against loss of effectiveness resulting from dissipation of its refrigerant charge, which comprises the steps of continuously monitoring, during operation of the system, the external temperature of a point on a heat-permeable vessel connected in the system circuit upstream from the evaporator, such vessel containing, at all times during normal operation of the system, liquid refrigerant and gaseous refrigerant and having an outlet near its bottom, the said point being located above said outlet but below the normal level of liquid refrigerant in said vessel, and utilizing a rise in the temperature so monitored to energize an alarm.

References Cited

UNITED STATES PATENTS

| | | | |
|---|---|---|---|
| 2,351,072 | 10/1948 | Cooper | 62—129 |
| 3,013,400 | 12/1961 | Sharpe | 62—202 |
| 2,106,756 | 2/1938 | Obermaier | 62—129 |
| 2,165,569 | 7/1939 | Obermaier | 62—129 |

LLOYD L. KING, Primary Examiner

U.S. Cl. X.R.

62—129